United States Patent [19]
Davis et al.

[11] Patent Number: 4,946,022
[45] Date of Patent: Aug. 7, 1990

[54] ARTICLE SORTING SWITCH

[75] Inventors: Bill E. Davis, Irving; Paul Podsiad, Plano, both of Tex.

[73] Assignee: Stewart Systems, Inc., Plano, Tex.

[21] Appl. No.: 397,721

[22] Filed: Aug. 23, 1989

[51] Int. Cl.$^5$ .............................................. B65G 47/46
[52] U.S. Cl. ..................................... 198/365; 198/440
[58] Field of Search ............... 198/365, 802, 437, 440, 198/841

[56] References Cited

U.S. PATENT DOCUMENTS

| | | |
|---|---|---|
| 2,446,890 | 8/1948 | Staddman . |
| 3,093,245 | 7/1963 | Worchester . |
| 3,115,236 | 12/1963 | Anetsberger ........................ 198/841 |
| 3,367,474 | 2/1968 | Kerr . |
| 3,608,698 | 9/1971 | Crall . |
| 3,735,867 | 5/1973 | Vanderhoof et al. . |
| 3,770,100 | 11/1973 | McCaul . |
| 3,780,850 | 12/1973 | McSwiggin . |
| 3,938,647 | 2/1976 | Raque ................................. 198/437 |
| 3,987,888 | 10/1976 | Wickam . |
| 4,143,752 | 3/1979 | Del Rosso . |
| 4,508,206 | 4/1985 | Moore et al. . |
| 4,586,601 | 5/1986 | Hodlewsky . |

FOREIGN PATENT DOCUMENTS
2402242 10/1974 Fed. Rep. of Germany .

Primary Examiner—Joseph E. Valenza
Attorney, Agent, or Firm—Michael A. O'Neil

[57] ABSTRACT

An article sorting switch comprising a plurality of pallet support members and means for moving pallet support members through a predetermined closed course. Pallets are slideably supported on the pallet support members in abutting relationship and have switch engaging members depending therefrom. The pallets have lower arcuate side portions that allow the pallets to remain in continuous sequential contact as the pallets pass through arcuate portions of the closed course. A switching mechanism is provided for selectively directing the pallets to one of several diverging article conveying paths. The article conveying paths are defined by sorting guide members, and return guide members are provided for realigning the pallets to a central location corresponding to the switching mechanism. Knife edge conveyors are provided to load and unload the article sorting switch without subjecting the articles to any substantial vertical drop. The article sorting switch is thereby especially adapted to handle loosely bound bundles of papers, letters, and magazines.

21 Claims, 7 Drawing Sheets

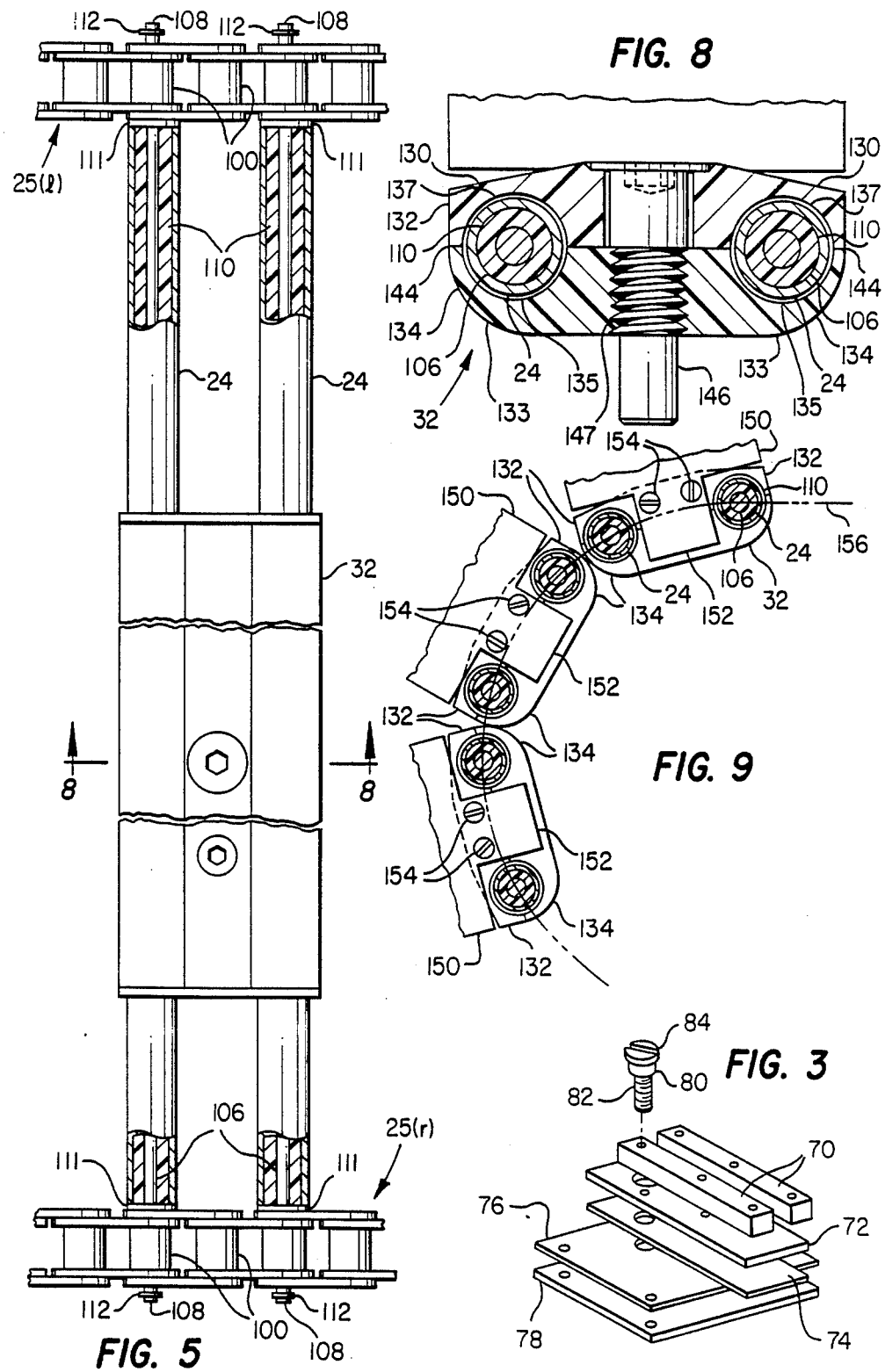

ARTICLE SORTING SWITCH

TECHNICAL FIELD

This invention relates to a sorting switch, and more particularly to a horizontal sorting switch adapted for receiving bundled papers, magazines and similar articles and selectively sorting and directing the articles to multiple output conveyors.

BACKGROUND AND SUMMARY OF THE INVENTION

In the art of article handling, various types of sorting devices have been provided heretofore. For example, switches have been provided for receiving articles from two or more input conveyors and for converging the articles, so that all articles are directed to a single output conveyor. Other switches have been designed to receive articles from a single input conveyor and to divert the articles so that the articles are selectively directed to one of two or more output conveyors. Still other sorting switches have operated to receive articles from a pair of input conveyors and to direct articles to a pair of corresponding output conveyors while selectively combining certain articles by directing them to a third output conveyor.

A number of devices have been developed which provide horizontal switching and sorting capabilities. Examples of such devices are the sorting switches disclosed and claimed in U.S. Pat. No. 3,986,596 issued Oct. 19, 1976 to D. R. Hamilton, U.S. Pat. No. 3,987,888 issued Oct. 26, 1976 to I. E. Wickam and U.S. Pat. No. 4,508,206 issued Apr. 2, 1985 to J. W. Moore. The foregoing patents, all of which are assigned to the Assignee hereof, disclose and claim sorting switches that constitute important contributions to the art of sorting switches and article handling. These switches are, however, primarily adapted to handle articles comprising integral units, such as boxes or tightly wrapped packages and are not particularly suitable for handling or sorting articles comprising loosely bound bundles of papers, letters or magazines.

Currently, the handling and sorting of loosely bound bundles of papers, letters and magazines is largely done by hand. For example, mail is delivered to post offices in sacks of loosely bound bundles of papers, letters and magazines. The bundles are removed from the sacks and manually delivered to individual work stations where the individual pieces are sorted. This process is labor intensive and time consuming. Heretofore the process of delivering the bundles of mail to the individual work stations has not been mechanized or automated due to the lack of a switch adapted to and suitable for sorting and switching loosely bound bundles of papers, letters and magazines.

The present invention comprises a novel sorting switch which fulfills the foregoing and other requirements long associated with the prior art. In accordance with the broader aspects of the invention, a plurality of pallets are mounted for sequential movement around a closed course incorporating an upper article sorting portion and a lower return portion. The upper sorting portion of the closed course comprises diverging article conveying paths. The diverging article conveying paths are defined by guide members, and the pallets may be selectively switched to travel along the article conveying paths defined by the guide members. The lower portion of the closed course comprises a return section wherein return guide members align the pallets along a central path corresponding to the location of a switching mechanism.

In accordance with the more specific aspects of the invention, a closed course is defined by a pair of parallel roller chains. Each pallet is slideably supported on a pair of parallel tubular pallet support members extending between and connected to the roller chains. Each pallet comprises an upper article bearing surface and arcuate lower side surfaces. Each pair of tubular pallet supports is positioned relative to the adjacent pairs of tubular pallet supports such that the sides of each pallet are maintained in substantially abutting relationship with the sides of each adjacent pallet as the pallets move through the closed course. Consequently, there are no gaps between the pallets through which a loose paper, letter or magazine might fall. Moreover, the arcuate lower side portions of the pallets allow the pallets to remain in constant contact as the pallets travel from the upper article sorting portion of the switch to the lower return portion.

Knife edge conveyors are used to load and unload bundles of loosely fastened papers, letters and magazines to and from the article sorting switch. The knife edge conveyors enable the sorting switch to be loaded and unloaded at substantially the same vertical elevation as the upper article sorting portion of the switch. Thus, loose bundles of papers, letters and magazines may be conveyed and switched without being subjected to any substantial vertical drops. The absence of any substantial vertical drops minimizes the number of bundles that are broken or fall apart and consequently reduces the amount of labor required to collect and rebundle loose pieces.

The present invention provides numerous advantages over the sorting switches of the prior art. The present invention provides a means of mechanizing the handling of loosely fastened bundles of papers, letters and magazines which, prior to the present invention, required the expenditure of significant labor. Another advantage of the present invention is the capability of switching and sorting loosely fastened bundles of papers, letters and magazines without subjecting the bundles to any substantial vertical drops, thereby minimizing the number of bundles broken, and the number of loose pieces requiring rebundling. Still another advantage of the present invention is the handling of articles comprising loosely bundled papers, letters and magazines in an economical manner heretofore unknown. These and other advantages deriving from the use of the invention will readily suggest themselves to those skilled in the art.

DESCRIPTION OF THE DRAWINGS

A more complete understanding of the invention may be had by reference to the following Detailed Description when taken in conjunction with the accompanying Drawings, wherein:

FIG. 3 is an exploded view of a portion of the switching apparatus;

FIG. 5 is an illustration of the pallets and pallet support arrangement of the sorting switch;

FIG. 8 is a sectional view taken across line 8 of FIG. 5 in the direction indicated by the arrows;

FIG. 9 is a further illustration of the arrangement of the pallets of the sorting switch;

DETAILED DESCRIPTION OF THE DRAWINGS

Figure 1:
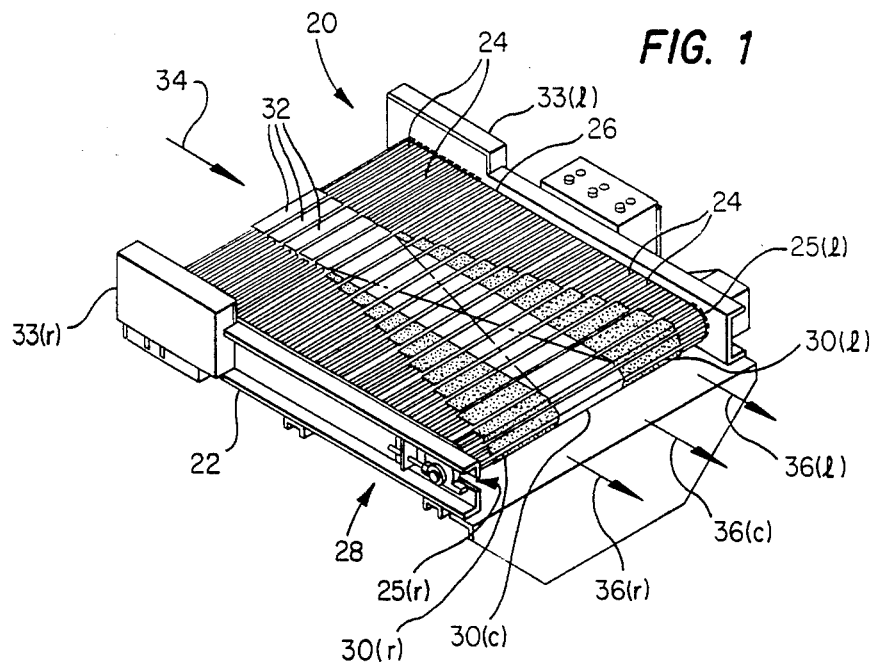
FIG. 1 is a perspective view of a sorting switch comprising the preferred embodiment of that invention.

Referring now to the Drawings, and particularly to FIG. 1 thereof, there is shown a sorting switch 20 incorporating the present invention. The sorting switch 20 includes a frame 22 which may be of any desired configuration. Preferably, however, the frame 22 is formed from steel and is designed to impart substantial structural rigidity to the sorting switch 20. The frame 22 also incorporates housings 33($l$) and 33($r$). The frame 22 is adapted for support either on a suitable structure, or from above.

A plurality of pallet support members 24 are mounted on roller chains 25($l$) and 25($r$) for movement around a closed course including an upper article sorting portion 26 and a lower return portion 28.

The upper article sorting portion 26 of the course is divided into diverging article conveying paths 30($l$), 30($c$) and 30($r$). Each of the pallet support members 24 extends across each of the article conveying paths 30($l$), 30($c$) and 30($r$). A plurality of pallets 32 are each slideably supported by pallet support members 24. In the operation of the sorting switch 20 the pallets 32 may be selectively aligned with, and switched between the diverging article conveying paths 30($l$), 30($c$) and 30($r$). Pallet support members 24 keep each of the pallets 32 in sequential continuous contact with each adjacent pallet. In the use of the sorting switch 20 articles are received from an input conveyor illustrated in FIG. 1 by arrow 34 and selectively switched to output conveyors illustrated in FIG. 1 as arrows 36($l$), 36($c$) and 36($r$).

Assuming that a loosely bound bundle of papers, letters and magazines is received from the input conveyor represented by arrow 34, if the pallets on which the bundle rests are allowed to remain in alignment with conveying path 30($c$), the bundle is delivered to the output conveyor represented by arrow 36($c$). Alternatively, if the conveyor represented by arrow 36($c$) is not available to receive the bundle, the pallets on which the bundle rests may be diverted to article conveying paths 30($l$) or 30($r$) for receipt by the conveyors represented by the arrows 36($l$) and 36($r$), respectively. The conveyors represented by arrows 34, 36($l$), 36($c$), and 36($r$) are especially adapted and positioned to deliver and to receive bundles to and from the sorting switch without subjecting the bundles to any appreciable vertical drop. This feature minimizes the number of bundles broken during the conveying and switching process, thereby reducing the number of loose papers, letters and magazines to be manually rebundled. Moreover, even if a bundle is broken and loose papers, letters and magazines are deposited on the switch 20, the loose pieces will not fall through the pallets because the pallets 32 are maintained in continuous sequential contact by pallet support members 24.

Figure 2:
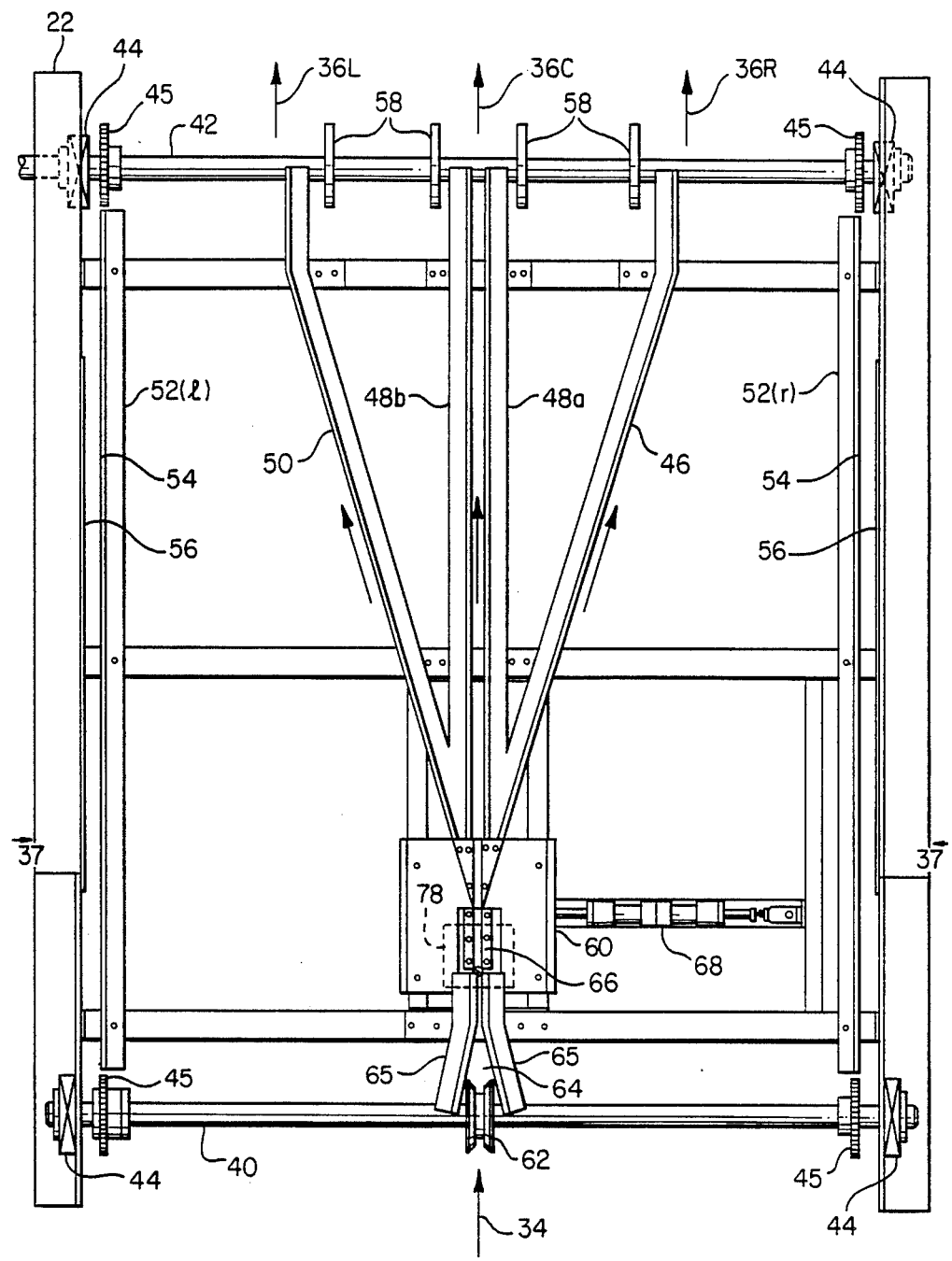
FIG. 2 is a top view of the frame and the switching apparatus of the sorting switch of FIG. 1.

Referring now to FIG. 2, there is shown the portion of the frame 22 of the sorting switch 20 corresponding to the upper article sorting portion 26 of the course of the pallet support members 24. The course of the pallet support members 24 is defined by a pair of axles 40 and 42 which are supported on frame 22 by bearings 44 for rotation about spaced parallel axes. The frame 22 includes sorting guide member 46 which is indicative of the path of travel of pallets 32 aligned with article conveying path 36($r$) and which remain in alignment therewith as they traverse the upper article sorting portion 26 of the course of the pallet support members. Similarily, sorting guide member 50 is indicative of the path of pallets 32 which are aligned with article conveying path 36($l$) and which remain in alignment therewith as they traverse the upper article sorting portion 26 of the course of the pallet support members. Sorting guide members 48($a$) and 48($b$) are indicative of the path of travel of pallets aligned with article conveying path 36($c$) and which remain in alignment therewith as they traverse the upper article sorting portion 26. Wear strips (not shown) may be attached to guide members 46, 48($a$), 48($b$) and 50. The wear strips minimize friction between the guide members and switch engaging members, which depend from pallets 32, thereby minimizing wear to the switching engaging members and the guide members 46, 48($a$), 48($b$) and 50.

Roller link chains 25($l$) and 25($r$) pass around sprockets 45. Roller link chains 25($l$) and 25($r$) are supported during movement through the upper article sorting portion by chain runners 52($l$) and 52($r$). Wear strips 54 are attached to chain runners 52($l$) and 52($r$) to reduce friction between roller chains 25($l$) and 25($r$), and chain runners 52($l$) and 52($r$) thereby reducing wear on the roller chains and the chain runners. Additionally, wear strips 56 provide additional support and further reduce friction.

Support wheels 58 are fastened to axle 42 and rotate synchronously therewith. As the pallets 32 move from the article sorting portion 26 of the closed course to the return portion 28 of the closed course, the undersides of the pallets 32 contact support wheels 58.

The sorting switch 20 includes switch apparatus 60. Guide wheel 62 directs the switch engaging members of the pallets 32 into the stationary channel 64 defined by converging guide members 65. Stationary channel 64 directs the switch engaging members of the pallets 32 to pivotably supported switching channel 66. Switching channel 66 is selectively positioned by a double acting cylinder 68 to direct the switch engaging members of the pallet 32 into alternative engagement with guide member 46, guide members 48($a$) and 48($b$) or guide member 50.

The switching channel 66 of the switch apparatus 60 is better illustrated in FIG. 3. A pair of diverter bars 70 are secured to a diverter plate 72 by means of suitable fasteners. The diverter bars 70 define a switch engaging member receiving channel therebetween. A layer of low friction material 74 is adhesively secured to the underside of diverter plate 72. Another layer of low friction material 76 is secured to a support plate 78 by means of suitable fasteners. The diverter plate 72 and therefore the diverter bars 70 are rotatably secured to support plate 78 by diverter post 80. Diverter post 80 includes a lower threaded portion 82 which is received in the support plate 78 and an upper bearing portion 84 which is received in the diverter plate 72. Thus, it will be understood that the switching channel 66 defines a switch engaging member receiving channel which is supported for pivotal movement about an axis defined by the diverter post 80. Given the use of layers of low friction material 74 and 76, the frictional resistance of such pivotal movement is quite low.

Figure 4:
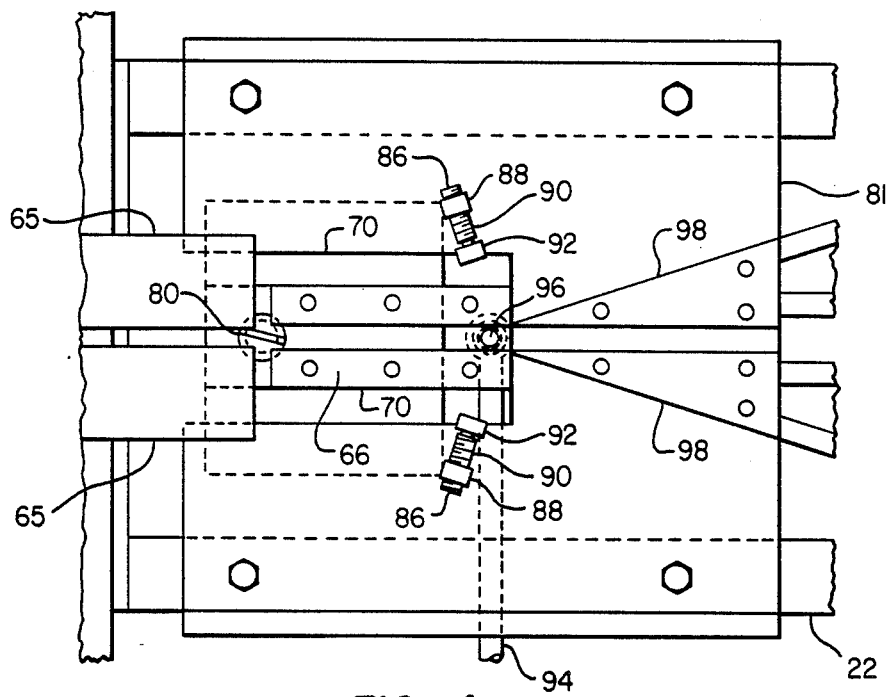
FIG. 4 is a further illustration of the switching apparatus of the sorting switch of FIG. 1.

The overall structure of the switching apparatus 60 of the sorting switch 20 is further illustrated in FIG. 4. The component parts of the switching apparatus are supported by base plate 81 which is in turn secured to the frame 22. The axis of pivotable movement of the diverter plate 72 and the diverter bars 70 carried thereby, as defined by the diverter post 80, is coincident with the entry end of the channel defined by the diverter bars 70. Therefore, the switching channel 66 is adapted to receive a switch engaging member depending from a pallet regardless of its pivotal positioning.

The limits of pivotal movement of the switching channel 66 are defined by a pair of stops 86. Each stop 86 includes a base 88 which is secured to the base plate 81, a threaded rod 90 which threadedly engages the base 88, and a diverter bar engaging stop 92 which is supported on a distal end of the threaded rod 90. The positioning of the stop 92 and, therefore the limits of pivotal movement of the switching channel 66 are determined by selectively rotating the threaded rod 90 of a particular stop 86 relative to the base 88 thereof.

The switching channel 66 is selectively pivoted by means of a rod 94 which is pivotally secured to the diverter plate 72 at 96. The rod 94 in turn extends to a suitable actuating mechanism, such as double acting cylinder 68. The actuating mechanism is selectively operated to effect pivoting of switching channel 66, the limits of the pivoting movement being governed by the stops 86.

FIG. 4 further illustrates a pair of stationary diverter bars 100 which are secured to base plate 81. The stationary diverter bars 100 comprise switch engaging member receiving portions of the guide members 46, 48(a), 48(b) and 50. It will be noted that the stationary diverter bars 100 mounted on the base plate 81 are adapted for manufacture from a length of bar stock by cutting the bar stock at an appropriate angle.

In the operation of the switching apparatus 60, it is practically impossible for the switch engaging members of the pallets 32 to come into contact with the stationary structure. In the use of the switching apparatus 60, it has been found that the pivotal positioning of the diverter bars 70 may be changed at any time, including, the time period during which the switch engaging members are passing therethrough. Of course, it is undesirable to change the pivotable positioning of the diverter bars 70 when a switch engaging member is aligned or substantially aligned with the ends of diverter bars 70 adjacent to stationary diverter bars 98.

Referring now to FIG. 5 the course of the pallet support members 24 of the sorting switch 20 is defined by a pair of roller chains 25(l) and 25(r) which comprise hollow pin roller chains and which are constrained around sprockets 45 mounted on axles 40 and 42. The drive chains 25(l) and 25(r) each comprise a series of interconnected links 100. Each pallet support member 24 is secured at either end thereof to chains 25(l) and 25(r) for movement thereby around the course.

More specifically, each pallet support member 24 is tubular having appertures at either end thereof. A support rod 106 having ends 108 extends through a pallet support member 24 and through hollow pins of adjacent links 100 of the drive chains 25(l) and 25(r). The ends 108 of each support rod 106 receive snap rings 112. Polyurethane foam 110 is disposed about each support rod 106 along its length for centering each support rod 106 within the pallet support members 24. The polyurethane foam 110, in addition to centering the support rods 106, also serves to prevent the support rods from rattling within the pallet support members 24. Flanges 111 are disposed between the ends of the pallet support members 24 and the roller chains 25(l) and 25(r), thereby acting as bushings. By these means, the opposite ends of each pallet support member 24 are secured to the roller chains 25(l) and 25(r) for movement thereby around the course.

Figure 6:
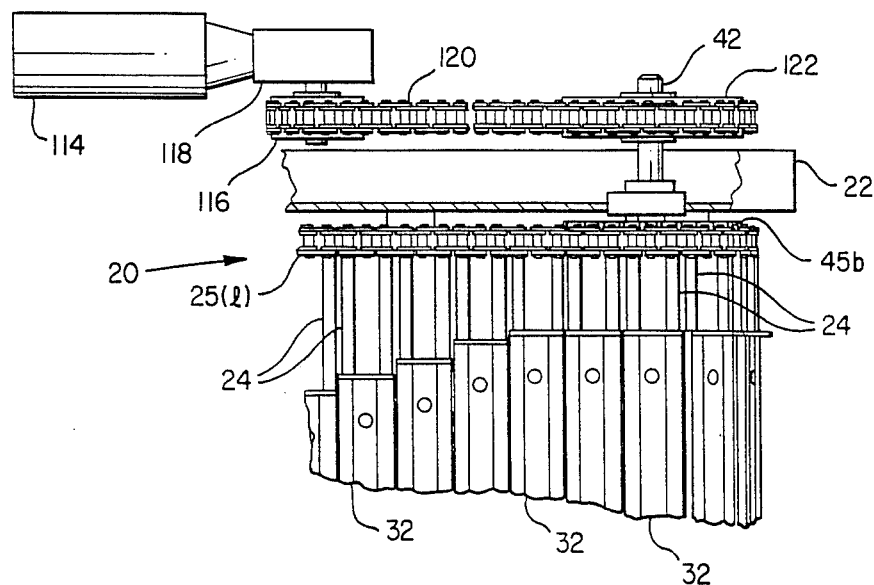
FIG. 6 is an illustration of the drive mechanism of the sorting switch.

The drive mechanism of the sorting switch 20 is illustrated in FIG. 6. An electric motor 114 drives a slip clutch sprocket 116 through a gear box 118. A drive chain 120 is constrained around the slip clutch sprocket 116 and a sprocket 122 mounted on axle 42. The axle 42 also supports sprockets 45 which receive roller chains 25(l) and 25(r). In this manner, the motor 114 operates through the gear box 118, the sprocket 116, the slip clutch sprocket 122, the axle 42 and sprockets 45 to drive the roller chains 25(l) and 25(r) and thereby move the pallet support members 24 around the course.

Referring to FIG. 8, the position of pallet support members 24 with respect to pallet 32 is illustrated in greater detail. The tubular pallet support members 24 are each received by a channel defined by semi-circular grooves 137 and 135 which run longitudinally along respective mating surfaces of the upper half 132 and the lower half 133 of pallet 32. The diameter of the channel formed by grooves 137 and 135 is sufficient to slideably accommodate a pallet support member 24. A switch engaging member 146 extends through the upper half 132 and the lower half 133 of the pallet and depends therefrom for engagement with the switching apparatus and guide members of the sorting switch 20. The switch engaging member 146 has an upper threaded portion 147 which is threadedly engaged with pallet 32. The lower half 133 of the pallet 32 also has arcuate sides 134. The arcuate sides 134 enable the pallets 32 to remain in continuous sequential contact as the pallets 32 move from the upper sorting portion 26 to the lower return portion 28 of the closed course and vice versa.

Each pair of pallet support members 24 supports a single pallet 32. The pallets 32 are preferably formed of a suitable plastic material having good wear resistance and may advantageously comprise plastic extrusions. For example, the pallets 32 may comprise ultra-high molecular weight polyethylene. Each pallet 32 comprises an upper half 132 and a lower half 133. The upper half 132 has an angled upper surface 130 and opposite sides which descend toward seam 144. The lower half 133 has a flat lower surface 131 and opposite sides which curve upwardly towards seam 144. The mating faces of upper and lower halves 132 and 133 are flat and define seam 144. Upper and lower halves 132 and 133 of pallet 32 each have a pair of semi-circular grooves 137 and 135 which run longitudinally along the respective mating faces. The diameter of, and the spacing between, grooves 137 and 135 are such that when upper and lower halves 132 and 133 of pallet 32 are mated, a pair of longitudinal channels of suitable diameter to slideably receive an adjacent pair of pallet support members are defined thereby. The upper and lower halves 132 and 133 of pallet 32 may be bonded together in mated relationship by suitable means such as adhesive or by threadedly receiving the threaded upper portion 147 of switch engaging member 146. Alternatively, pallets 32 could be extruded as integral units thereby eliminating seam 144.

As illustrated by FIG. 9 retaining strips 150 are mounted on opposite ends of the pallets 32. The retaining strips 150 are substantially rectangular in shape with a fastening strip 152 descending therefrom. The fastening strip 152 is positioned between the pallet support members 24 and is secured to the end of the pallet 32 by means of screws 154. Of course, the fastening strips 152 could be secured to the ends of the pallet by alternative means, including the use of an appropriate adhesive. During operation of the switch 20, the retaining strips 150 serve to retain loose articles such as papers, letters or magazines on the pallets 32. Additionally, as loose bundles move from the switch 20 to a subsequent conveyor, the retaining strips 150 guide the bundles and any loose letters, papers or magazines into a path corresponding to the subsequent conveyor. The retaining strips 150 may be manufactured from any suitable material including plastics, rubber or a flexible belting material.

FIG. 9 also illustrates the manner in which the pallets 32 are maintained in continuous sequential contact as they move from the upper sorting portion 26 to the lower return portion 28 and vice versa. The broken line 156 in FIG. 9 represents the arc travelled by the pallets 32 as the pallets 32 move from the upper sorting portion 26 to the lower return portion 28 of the closed course. Pairs of pallet support members 24 are mounted on roller chains 25(l) and 25(r) on adjacent links 100 of the roller chains 25(l) and 25(r). The position of the pallet support members 24 on the roller chains 25(l) and 25(r) serves to keep the sides of the upper halves 132 of adjacent pallets 32 in contact as the pallets move through the horizontal upper sorting portion and the lower return portions of the closed course. The sides of the upper halves 132 of adjacent pallets 32, however, separate as the pallets move through the arc defined by line 156. Moreover, if the lower portions of the sides of the pallets 32 were flat, the pallet support members 24 of adjacent pallets 32 would be forced apart as the pallets moved through the arc defined by line 156. Consequently, the sides of the lower halves 133 of the pallets 32 are curved along an appropriate radius to form arcuate surfaces 134. The pallets 32 are thereby maintained in continuous contact as the pallets 32 move from the upper sorting portion 26 through the arc defined by line 156 to the lower return portion 28 of the sorting switch 20. Additionally, the rolling motion that occurs between arcuate surfaces 134 of adjacent pallets as the pallets move through the arc defined by line 156 tends to eject papers or letters that may have become wedged between adjacent pallets 32 as the articles were loaded onto the sorting switch 20.

Figure 7:
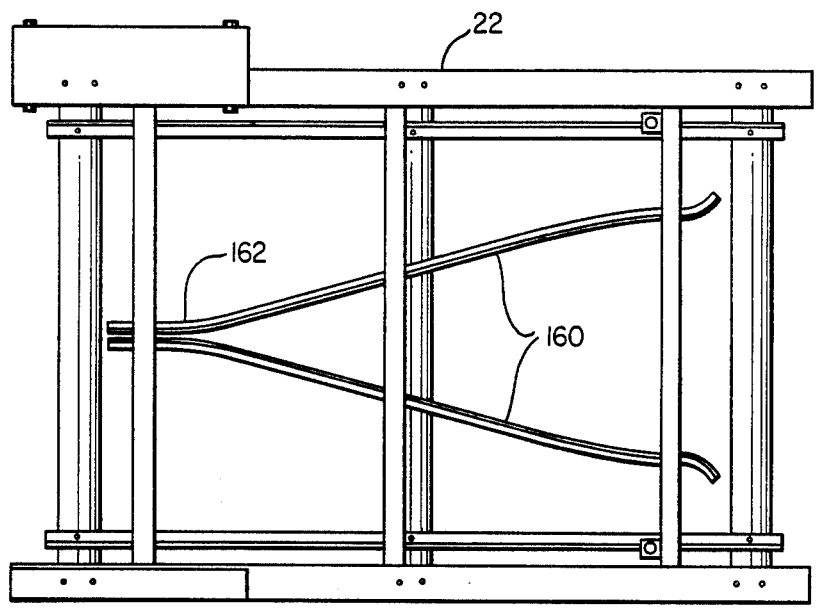
FIG. 7 is an illustration of the return portion of the frame of the sorting switch.

The portion of the frame 22 of the sorting switch 20 comprising the return portion 28 of the course of the pallet support members 24 is illustrated in FIG. 7. The switch engaging members 146 of any pallets 32 that have been diverted out of central alignment, particularly those pallets 32 that have been diverted to article conveying paths 30(r) and 30(l), engage return guide members 160. The function of the return guide members 160 is to return each pallet 32 to an orientation wherein the switch engaging member 146 of each pallet 32 is aligned with guide wheel 62 as the pallets 32 move from the lower return portion 28 to the upper sorting portion 26 of the switch 20. The return guide members 160 form return guide channel 162 through which the switch engaging members 146 of the pallets 32 move as the pallets 32 approach the end of the lower return portion 28 of the switch 20. The switch engaging numbers 146 of the pallets 32 then engage guide wheel 62 and are directed toward switching apparatus 60 for selective alignment with article conveying paths 30(l), 30(c), or 30(r) as required.

Figure 10:
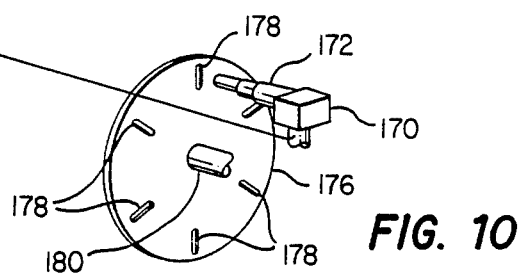
FIG. 10 is an illustration of a portion of the switching control apparatus of the sorting switch comprising a synchronizing photo electric cell.

Referring now to FIG. 10, there is shown a synchronizing photo responsive apparatus which is utilized in sorting switch 20 to permit switching by the switching apparatus 60 only between bundles rather than under them. A photo eye/sensor 170 has a series of lenses 172 which direct a beam of light toward a reflector 174. The path of the beam of light from the photo eye/sensor 170 extends through a pallet positioning wheel 176 and is reflected back to the photo eye/sensor 170 by reflector 174. The wheel 176 is provided with a plurality of slots 178, each indicative of the positioning of the switch engaging member of a pallet. The wheel 176 is supported on shaft 180 which is rotated in accordance with the movement of the pallets 32 under action of the drive motor 114. As a slot 178 passes between photo eye/sensor 170 and reflector 174, the photo eye/sensor 170 senses the beam of light reflected by reflector 174, thus indicating the position of a switch engaging member. It will be understood that wheel 176 may include a different number of slots 178 that is either equal to or is equal to a multiple of the number of pallets of sorting switch 20 depending upon the ratio of the speed of rotation of the wheel 176 to the speed of pallet movement. The synchronizing photo responsive assembly may be conveniently located in either of housing's 33(l) or 33(r) of the sorting switch 20 shown in FIG. 1.

In addition to the synchronizing function performed by the photo responsive apparatus of FIG. 10, sorting switch 20 is preferably provided with an article detecting photo responsive apparatus. Such an apparatus will insure that all pallets on which a bundle rests follow the same path across the upper article sorting portion 26 of the sorting switch 20. Accordingly, sorting switch 20 is provided with a photo eye/sensor and reflector which may be mounted separately in housings 33(l) and 33(r) of FIG. 1 at the input end of sorting switch 20. The photo eye/sensor and the reflector are positioned directly across from each other immediately above the upper article sorting portion 26 of sorting switch 20 and behind apertures (not shown) in housings 33(r) and 33(l), respectively. A beam of light is directed transversely across the upper article sorting portion 26 and is reflected back to the photo eye/sensor by the reflector. The beam of light is therefore broken if an article is positioned in the upper article sorting portion 26 between the photo eye/sensor and the reflector.

Arrows 37 in FIG. 2 designate the preferred position of the photo eye/sensor and the reflector with respect to the frame and switching apparatus of sorting switch 20 and hence define the approximate preferred position at which an article will be detected along the upper article sorting path 26. Arrows 37 are disposed along upper article sorting path 26 at a point approximately between diverter bars 100 and sorting guide members 46, 48(a), 48(b) and 50. Therefore, the photo eye/sensor will detect the presence of an article soon after the first of the pallets on which the article rests pass the switching channel 66. As long as an article is detected by the photo eye/sensor, the pivotal position of switching channel 66 will remain unchanged, thereby assuring that all pallets which carry an article are directed along the same path during their movement across the upper article sorting portion 26. The synchronizing photo responsive apparatus and the article detecting photo responsive apparatus are connected in series to prevent the switching of switching apparatus 60 as an article passes above switching apparatus 60 thus assuring that all pallets supporting an article follow the same path across upper article sorting portion 26 of sorting switch 20.

Figure 11:
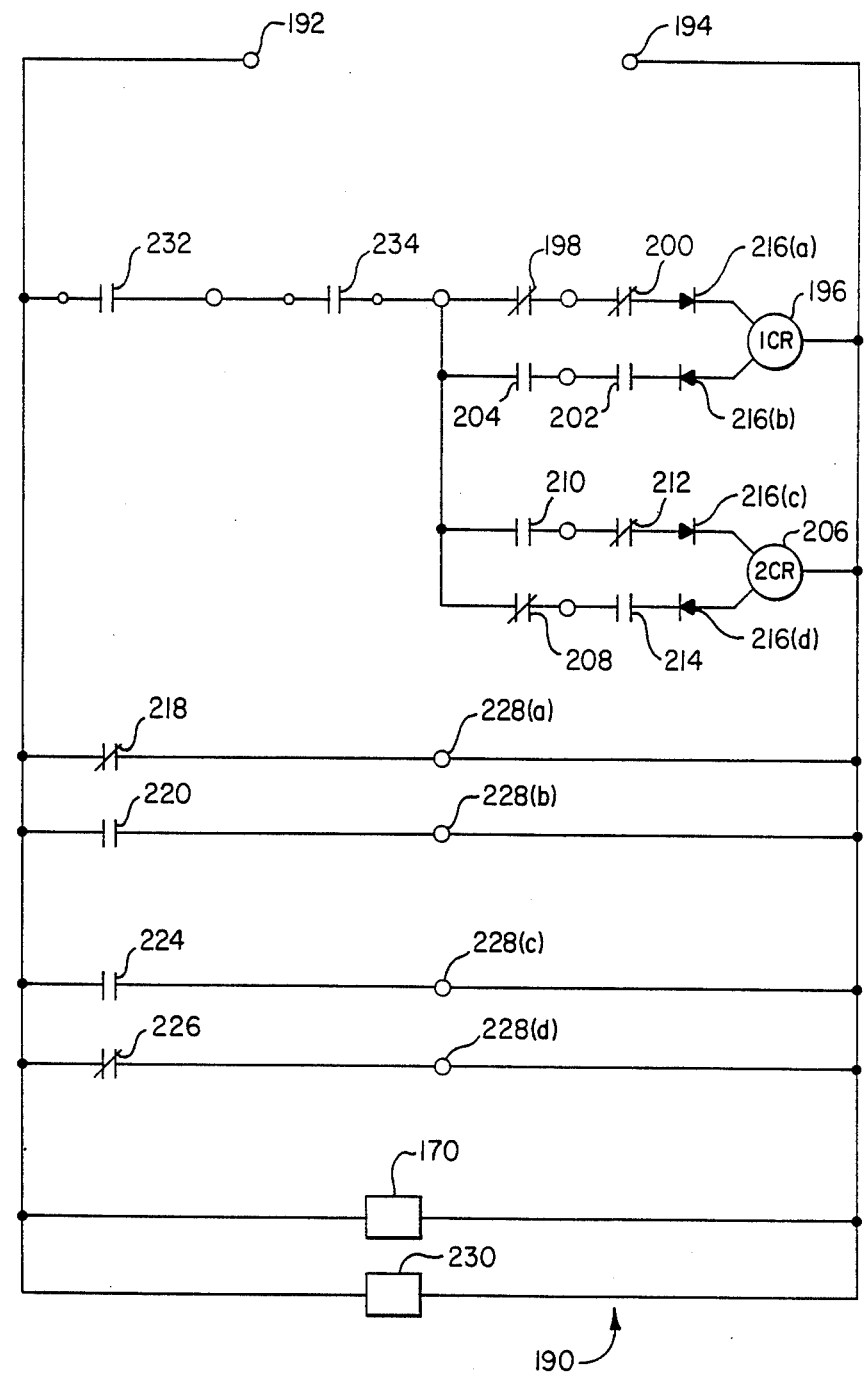
FIG. 11 is a schematic illustration of an electrical control circuit utilized in the sorting switch.

Referring now to FIG. 11, the synchronizing photo responsive apparatus of FIG. 10 and the article detecting photo responsive apparatus are utilized in conjunction with an electrical control circuit 190. Conventional 115 volt, 60 hz line current is received through a pair of terminals 192 and 194. The switching apparatus 60 of the sorting switch 20 is normally conditioned to direct pallets 32 along one of the article conveying paths 30(l), 30(c) or 30(r). If, for example, it is desired to divert the pallets into alignment with the left article conveying path 30(l), a manual three way switch (not shown) is moved to a position corresponding to the left article conveying path 30(l).

Assuming that photo eye/sensor 170 of FIG. 10 is receiving light, normally open contacts 234 will be closed. Similarly, assuming that the photo eye/sensor 230 of the article detecting apparatus is receiving light, normally open contacts 232 will be closed. If these conditions are met, when the manual switch is moved to the position corresponding to the left article conveying path 30(l), current flows through normally closed contacts 198, latch contacts 200 and diode 216(a) to energize control relay 196. Control relay 196 then closes normally open contacts 224 and opens normally closed contacts 226. Contacts 218 and 224 allow current to flow to solenoid windings 228(a) and 228(c) to cause a valve (not shown) to supply compressed air to the appropriate side of double acting cylinder 68 that pivots switching channel 66 to a position corresponding to the left article conveying path 30(l).

If it desired to direct the pallets into alignment with the right article conveying path 30(r), the manual switch may be moved to a position corresponding to the right article conveying path 30(r) and the foregoing process is reversed. Contacts 200 are opened and control relay 196 is de-energized thus opening contacts 224 and closing contacts 226. Simultaneously contacts 210 and 212 are closed thereby energizing control relay 206. Control relay 206 opens normally closed contacts 218 and closes normally open contacts 220. Thus, current flows through contacts 220 and 226 to solenoid windings 228(b) and 228(d) to cause a valve (not shown) to supply compressed air to the cylinder 68 that pivots switching channel 66 to a position corresponding to the right article conveying path 30(r).

If it is desired to divert the pallets to a position corresponding to the center article conveying path 30(c), the manual switch may be moved to a position corresponding to the center article conveying path 30(c) whereupon both control relays 196 and 206 are de-energized, and contact pairs 218 and 226 will be closed, supplying operating power to solenoid windings 228(a) and 228(d) causing a valve (not shown) to supply air to double acting cylinder 68 and center the cylinder 68 that pivots switching channel 66 to a position corresponding to the center article conveying path 30(c).

It will be understood by those skilled in the art that control relay 196, when energized, opens normally closed contacts 210 and closes normally open contacts 208. Since contacts 214 are normally closed (in the unlatched condition), the negative cycles of the A.C. voltage on terminals 192 and 194 pass through diode 216(d) to hold control relay 206 de-energized when control relay 196 is energized.

Although the operation of the switching apparatus 60 has been described in connection with the use of a manually operated switch, it will be readily appreciated by those skilled in the art that the switch and switching operation may be readily adapted to automated actuation. Moreover, the operation of the switching apparatus may be computer-controlled if desired.

Figure 12:
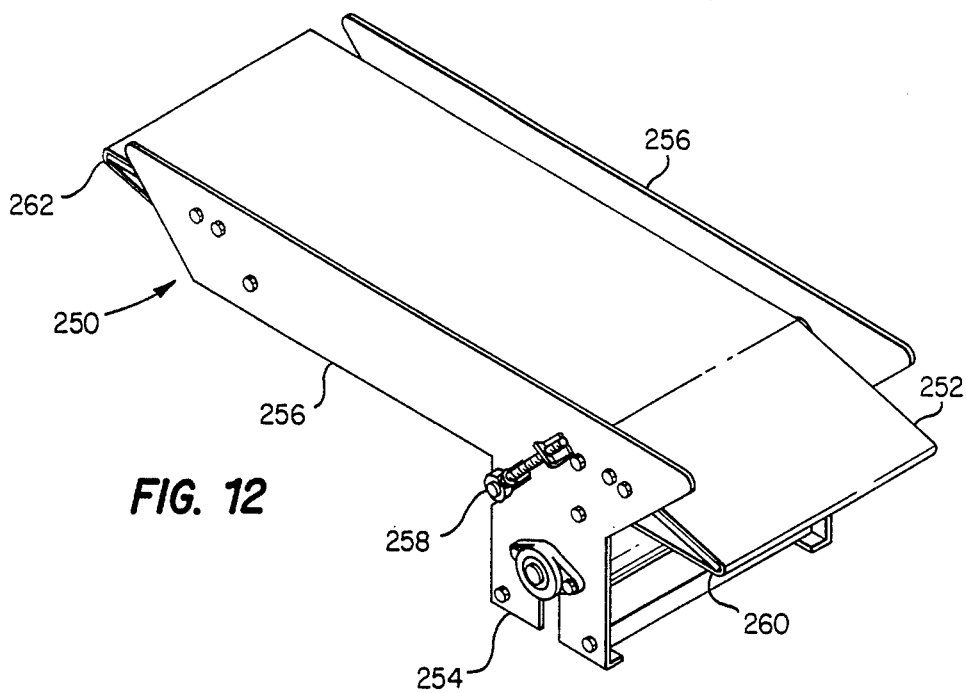
FIG. 12 is a perspective view of a knife edge conveyor.

Referring now to FIG. 12, a knife edge conveyor 250 has an endless conveyor belt 252 that moves through a closed course characterized by extreme angles at the ends thereof. A frame 254 of the knife edge conveyor 250 includes side members 256 which serve as guides for the endless conveyor belt 252. A take-up apparatus 258 is provided for tensioning the endless conveyor belt 252. The endless conveyor belt 252 passes over stationary belt guides 260 and 262 located at opposite ends of the knife edge conveyor 250.

Figure 13:
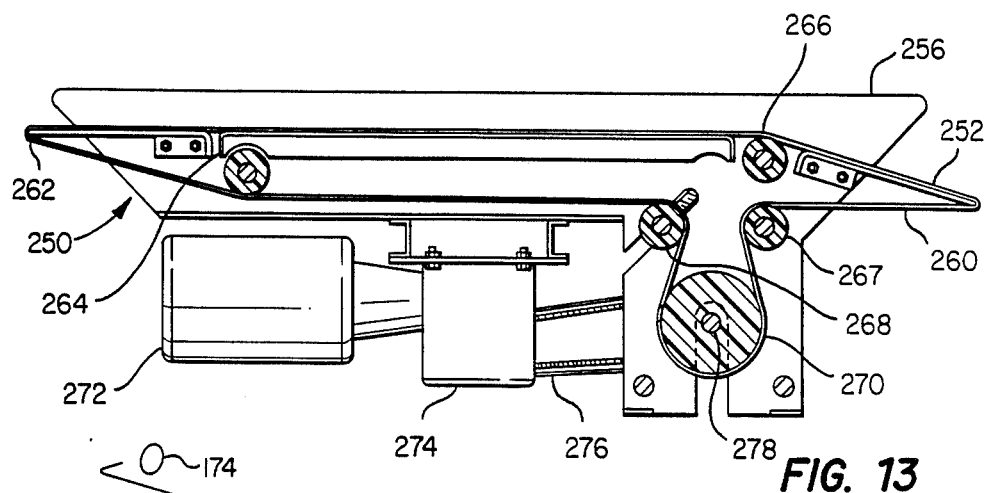
FIG. 13 is a sectional view of a knife edge conveyor.

Referring now to FIG. 13 the belt guide 262 and belt support 264 define an upper flat portion of the closed course through which endless conveyor belt 252 passes. Idler roller 266 and belt guide 252 define a gradually inclined portion of the closed course descending from the upper flat portion. A second idler roller 267 and take up roller 268 direct the endless conveyor belt 250 around drive pulley 270.

The endless conveyor belt 252 of knife edge conveyor 250 is driven by an electric motor 272 operating through a gear box 274 to drive the sprocket (not shown) engaged by drive chain 276. Drive chain 276 engages and drives a sprocket (not shown) mounted on shaft 278 of the drive pulley 270. The drive pulley in turn engages and drives the endless belt 252 of the knife edge conveyor 250. The knife edge conveyor may also be equipped with a photo eye/sensor and reflector for detecting the presence of articles upon knife edge conveyor 250. The photo eye/sensor and reflector may be mounted at appropriate locations on side members 256.

It is to be understood that knife edge conveyor 250 is used as the input conveyor 34 and output conveyors 36(l), 6(c) and 36(r) of FIG. 1. When used as the input conveyor 34, the end of the endless conveyor 250 corresponding to inclined belt guide 260 is positioned adjacent to the beginning of the upper article sorting portion 26 of the sorting switch 20. It will be appreciated that articles placed on knife edge conveyor 250 will travel across the upper flat portion of the knife edge conveyor 250 and down the inclined portion defined by belt guide 260 to be deposited on pallets 32. Articles conveyed in this manner are thereby not subjected to any appreciable vertical drop. In this manner, loosely bound bundles of papers, letters and magazines may be conveyed and deposited on sorting switch 20 with a minimal number of broken bundles.

The knife edge conveyor, when used as output conveyor 36(*l*), 36(*c*) or 36(*r*), is positioned with the end of the knife edge conveyor 250 corresponding to belt guide 262 immediately adjacent to the end of article conveying path 30(*l*), 30(*c*) or 30(*r*). Conveyors 36(*l*), 36(*c*) and 36(*r*) may therefore receive articles from article conveying paths 36(*l*), 36(*c*) and 36(*r*) respectively without subjecting the articles to any significant vertical drop. Additionally, it is to be understood that the retaining strips 150 fastened to the ends of the pallets 32 pass immediately adjacent to side members 256 thereby minimizing the possibility that loose papers, letters or magazines items will fall between the sorting switch 20 and the output conveyors 36(*l*), 36(*c*) and 36(*r*).

Figure 14:
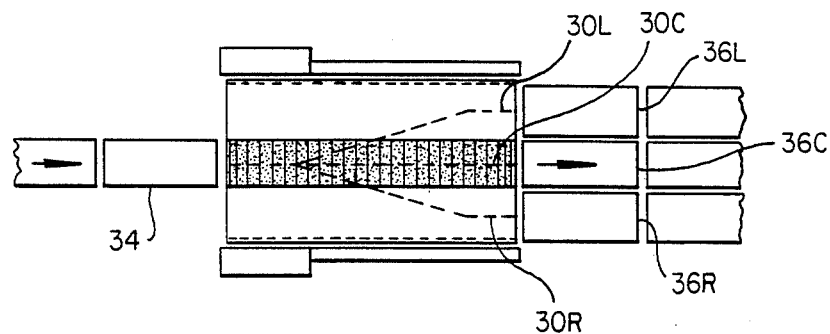
FIG. 14 is a top view of the sorting switch with the pallets aligned along a central path.
Figure 15:
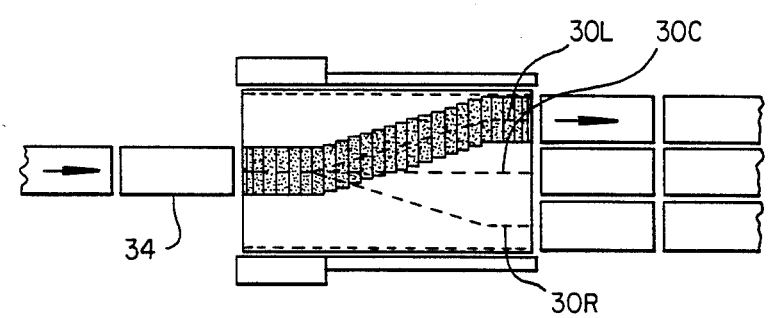
FIG. 15 is a top view of the sorting switch which wherein the pallets are aligned along a diverging path.
Figure 16:
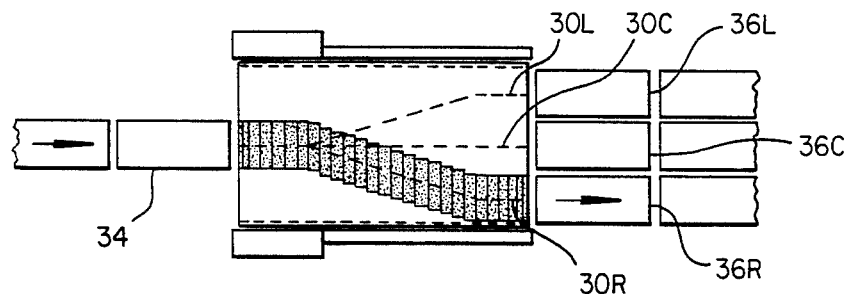
FIG. 16 is a top view of the sorting switch wherein the pallets are aligned along an alternate diverging path.

FIGS. 14, 15 and 16 illustrate the sorting switch of the present invention in its various modes of operation. In FIG. 14 the pallets 32 of the sorting switch 20 have been selectively aligned to travel along article conveying path 30(*c*). In FIG. 15 the pallets 32 of the sorting switch 20 have been selectively aligned to travel along article sorting path 30(*l*). In FIG. 16, the pallets 32 of the sorting switch 20 have been selectively aligned to travel along article sorting path 30(*r*). In FIGS. 14, 15 and 16 knife edge input conveyor 34 delivers articles to the pallets 32 at the beginning of the upper sorting portion 26 of the close course of sorting switch 20. In FIGS. 14, 15 and 16 articles are received by knife edge output conveyors 36(*l*), 36(*c*) and 36(*r*) from the ends of the upper sorting portion 26 at positions corresponding to the ends of article sorting paths 30(*l*), 30(*c*) and 30(*r*) as indicated.

From the foregoing, it will be understood that the present invention comprises a novel sorting switch incorporating numerous advantages over the prior art. One of the primary advantages deriving from the use of the invention involves the fact that by means thereof, it is possible to mechanically handle and sort articles comprising loosely bound bundles of papers, letters and magazines. Heretofore, loosely bound bundles of papers, letters and magazines required manual handling and delivery to sorting stations. The present invention eliminates to a large extent the need for manual handling of loosely bound bundles of papers, letters and magazines, including the delivery thereof to sorting stations, thus reducing the labor costs attendant thereto. Moreover, the present invention conveys and switches loosely bound bundles of papers, letters and magazines without subjecting the bundles to any substantial drop, thereby minimizing the number of loose pieces generated. This in turn reduces the amount of labor required to rebundle loose pieces and the costs attendant thereto. Other advantages deriving from the use of the invention will readily suggest themselves to those skilled in the art.

The present invention, although disclosed and illustrated herein with three diverging article conveying paths, is readily adapted to article sorting switches incorporating two or four diverging article conveying paths. Additionally, while it is contemplated that the pallets of the present invention will remain in continuous contact throughout the closed course, it is understood that due to manufacturing tolerances, small separations may exist between the pallets. Such small separations will not, however, compromise the operation of the switch of the present invention.

Although the invention has been described in the foregoing Detailed Description and illustrated in the accompanying Drawings, it will be understood that the invention is not limited to the embodiment disclosed, but is capable of numerous rearrangements, modifications, and substitution of parts and elements without departing from the spirit and scope of the invention.

We claim:

1. An article sorting switch comprising:
   a plurality of pallet support members;
   means for moving said pallet support members through a predetermined closed course, said course comprising an upper article sorting portion and a lower return portion, said upper article sorting portion comprising a plurality of diverging article conveying paths;
   sorting guide means, associated with each of said article conveying paths;
   return guide means associated with said lower return portion of said closed course;
   a plurality of pallets in substantially abutting relationship, each of said pallets comprising a top portion and lower arcuate side portions, each of said pallets being slideably retained on at least one of said pallet support members, said arcuate side portions allowing said pallet support members to retain each of said pallets in substantially continuous sequential contact with each adjacent pallet as said pallets are moved through the closed course;
   switch engaging means, said switch engaging means depending from each of said pallets;
   switching means for receiving said switch engaging means and selectively directing said pallets to one of said diverging article conveying paths.

2. The article sorting switch of claim 1, further comprising a knife-edge input conveyor for conveying articles to said upper sorting portion of said closed course.

3. The article sorting switch of claim 1, further comprising knife edge output conveyors for receiving articles from said conveying paths.

4. The article sorting switch of claim 2 wherein one end of said knife edge input conveyor is positioned adjacent to and at substantially the same vertical elevation as said article sorting portion of said closed course.

5. The article sorting switch of claim 3 wherein one end of each of said knife edge output conveyors is located adjacent to and at substantially the same vertical elevation as said article sorting portion of said closed course.

6. The article sorting switch of claim 1 wherein said switching means comprises a pivotable channel for receiving said switch engaging members and selectively directing said pallets to one of said diverging article conveying paths.

7. The article sorting switch of claim 1 wherein said pallet support members comprise hollow tubes.

8. The article sorting switch of claim 1 wherein each of said pallets is mounted on a pair of said pallet support members.

9. The article sorting switch of claim 1, further comprising article detecting means for controlling said switching means.

10. The article sorting switch of claim 1 wherein said means for moving said pallet support members comprises a pair of parallel roller chains.

11. An article sorting switch comprising:
a plurality of pallet support members;
means for moving said pallet support members through a closed course, said course comprising a lower return portion and an upper sorting portion, said upper article sorting portion comprising a plurality of diverging article conveying paths;
a plurality of pallets in substantially abutting relationship, each of said pallets comprising a top portion, lower arcuate side portions and switch engaging means, each of said pallets being slideably retained on a pair of said article support members, said arcuate side portions allowing said pairs of said pallet support members to retain each of said pallets in substantially continuous sequential contact with each adjacent pallet as said pallets are moved through said closed course;
sorting guide members, said guide members defining said diverging article conveying paths;
return guide members, said return guide members defining said lower return portion of said closed course;
a pivotable switch for receiving said switch engaging members and selectively directing said pallets to one of said diverging article conveying paths, said switch engaging members cooperating with said sorting guide members and said pallet support members to move said pallets through a selected one of said article conveying paths.

12. The article sorting switch of claim 11, further comprising a knife edge input conveyor for conveying articles to said upper sorting portion of said closed course.

13. The article sorting switch of claim 11 further comprising knife edge output conveyors corresponding to each of said article conveying paths for receiving articles from said conveying paths.

14. The article sorting switch of claim 12 wherein one end of said knife edge input conveyor is positioned adjacent to and at substantially the same vertical elevation as said article sorting portion of said closed course.

15. The article sorting switch of claim 13 wherein one end of each of said knife edge output conveyors is located adjacent to and at substantially the same vertical elevation as said article sorting portion of said closed course.

16. The article sorting switch of claim 11 wherein said pallet support members comprise hollow tubes.

17. The article sorting switch of claim 11 wherein said means for moving said pallet support members comprises a pair of parallel roller chains.

18. A sorting switch comprising:
a pair of parallel chains, said chains defining a predetermined closed course comprising an upper article sorting portion and a lower return portion, said upper article sorting portion comprising diverging first, second and third article conveying paths;
pairs of parallel tubular pallet supports, each of said tubular pallet supports extending between and connected to said chains;
a plurality of pallets in substantially abutting relationship, each of said pallets comprising a top portion, lower arcuate side portions and a switch engaging member, each of said pallets being slideably retained for transverse movement on one of said pairs of said tubular supports, said arcuate side portions allowing said pairs of said tubular supports to retain each of said pallets in substantially continuous sequential contact with each adjacent pallet as said pallets are moved through said closed course;
sorting guide members, said guide members defining said first, second and third article conveying paths;
return guide members, said return guide members defining said lower return portion of said closed course;
a pivotable switch channel for receiving said switch engaging members and selectively directing said pallets to one of said first, second or third article conveying paths;
a knife edge input conveyor for conveying articles to said upper article sorting portion of said closed course;
three knife edge output conveyors, corresponding to said first, second and third article conveying paths, for receiving articles from said conveying paths.

19. A plurality of pallets and pallet support means for movement around a closed course including at least one straight and one arcuate portion, each of said pallets comprising:
a top portion;
flat upper side portions;
arcuate lower side portions;
each of said pallets being retained on said pallet support means, said pallet support means retaining said flat upper side portions in substantially abutting relationship for movement through said straight portion of said course, said lower arcuate side portions allowing said pallet support means to retain said pallets in substantially continuous sequential contact with each adjacent pallet as said pallets are moved through said arcuate portion of said closed course.

20. The pallets and pallet support means of claim 19 wherein said pallet support means comprise hollow tubes, said tubes including insulating material contained inside said tubes.

21. The pallets and pallet support means of claim 19 wherein said pallets define internal longitudinal channels, said support means passing through said channels and slidable supporting said pallets.

* * * * *